United States Patent
Nilsson et al.

(10) Patent No.: US 7,379,724 B2
(45) Date of Patent: May 27, 2008

(54) METHOD AND APPARATUS FOR CLASSIFYING INTERFERENCE

(75) Inventors: Johan Nilsson, Malmö (SE); Christer Östberg, Staffanstorp (SE); Håkan Eriksson, Lund (SE)

(73) Assignee: Telefonkatiebolaget LM Ericsson (PUBL), Stockholm (SE)

( * ) Notice: Subject to any disclaimer, the term of this patent is extended or adjusted under 35 U.S.C. 154(b) by 262 days.

(21) Appl. No.: 10/025,526

(22) Filed: Dec. 18, 2001

(65) Prior Publication Data

US 2002/0137485 A1 Sep. 26, 2002

Related U.S. Application Data

(60) Provisional application No. 60/259,166, filed on Dec. 28, 2000.

(30) Foreign Application Priority Data

Dec. 20, 2000 (EP) .................................. 00610133

(51) Int. Cl.
*H04B 1/18* (2006.01)
(52) U.S. Cl. ..................... 455/296; 455/63.1
(58) Field of Classification Search ............. 455/226.1, 455/226.3, 226.4, 63.1, 67.11, 67.13, 67.7, 455/501, 296, 307
See application file for complete search history.

(56) References Cited

U.S. PATENT DOCUMENTS

| | | | |
|---|---|---|---|
| 5,144,642 A | 9/1992 | Weinberg et al. | 375/10 |
| 5,509,030 A * | 4/1996 | Mortensen | 375/232 |
| 5,568,480 A | 10/1996 | Müller | 370/69.1 |
| 5,809,017 A * | 9/1998 | Smith et al. | 370/318 |
| 5,933,768 A * | 8/1999 | Skold et al. | 455/296 |
| 6,131,013 A | 10/2000 | Bergstrom et al. | 455/63 |
| 6,137,785 A * | 10/2000 | Bar-Ness | 370/328 |
| 6,144,861 A | 11/2000 | Sundelin et al. | 455/522 |
| 6,233,443 B1 * | 5/2001 | Brommer | 455/296 |
| 6,243,584 B1 * | 6/2001 | O'Byrne | 455/447 |
| 6,363,127 B1 * | 3/2002 | Heinonen et al. | 375/345 |
| 6,574,270 B1 * | 6/2003 | Madkour et al. | 375/148 |
| 6,684,079 B1 * | 1/2004 | Aretz et al. | 455/502 |

FOREIGN PATENT DOCUMENTS

GB    2 347 825 A    9/2000

OTHER PUBLICATIONS

International Search Report as completed by the ISA/EP on Apr. 16, 2002, in connection with Internatioanl Patent Application No. PCT/EP01/14198 filed on Nov. 28, 2001.

* cited by examiner

*Primary Examiner*—George Eng
*Assistant Examiner*—Sam Bhattacharya
(74) *Attorney, Agent, or Firm*—Michael Cameron (57) ABSTRACT

A mobile communications terminal for use in a cellular communications system such as a CDMA system. The terminal includes an electronic circuit for receiving a wireless communications signal carrying signal channels having processing means for extracting the signal channels. The electronic circuit is adapted to classify a type of interference affecting the communications quality by evaluating signals selected in the electronic circuit that are selected as signals having information for classifying a type of interference in one of at least two predetermined classes of interference.

18 Claims, 4 Drawing Sheets

METHOD AND APPARATUS FOR CLASSIFYING INTERFERENCE

This patent application claims priority from and incorporates by reference the entire disclosure of U.S. Provisional Patent Application No. 60/259,166, filed on Dec. 28, 2000, now abandoned.

BACKGROUND

1. Technical Field

This invention relates to a mobile communications terminal for use in a cellular communications system, comprising an electronic circuit for receiving a wire-less communication signal carrying signal channels having processing means for extracting the signal channels.

2. History of Related Art

A typical cellular telecommunications system cell is organized about a base-station equipped with multiplexing means for transmitting communication signals carrying signal channels from a wired telephone net onto a frequency carrier that is broadcast by an antenna system over an area that the cell is designate to cover. A set of individual mobile subscriber stations—i.e. a mobile communications terminal—are each equipped to receive the broadcast frequency carrier and to de-multiplex the specific channel the terminal is intended to receive. Typically, two-way communication is supported and the mobile communications terminal is adapted to transmit signals to the base-station for subsequent multiplexing and distribution to a wired net or another base-station.

In such a wire-less communications system, an assigned radio frequency bandwidth of frequencies is simultaneously shared by multiple subscribers using various multiple access techniques e.g. code division multiple access (CDMA). In CDMA systems multiple subscribers can be accommodated on a single carrier in which each subscriber is assigned one or multiple codes that is used to carry information. A code waveform taken from a set of orthogonal waveforms allows the system to transmit information in separate information channels. These separate information channels can be used to carry individual information to different users and/or enable multiple information streams to one user.

However, in such systems different types of interference may occur and diminish the communication quality. The interference situation can vary from time to time depending on the location of the mobile communications terminal relative to the base-station, the location of other base-stations, the actual load of the system, and the type of traffic on the communication channels. Furthermore, moving the mobile communications terminal relative to the base-station and movement of other objects affecting the transmission path between the base-station and the mobile communications terminal can affect the interference situation.

Basically, interference can be divided into two groups:
1. inter-cell interference, and
2. intra-cell interference.

Inter-cell interference originates from one or more neighbouring base stations. The fading of inter-cell interference is uncorrelated with the fading of the communication signal. In the following, inter-cell interference refers to interference that has an uncorrelated fading or no fading. Thus, inter-cell interference can be caused by thermal noise etc.

Intra-cell interference originates from the same base station as the base station communicating with the mobile communications terminal. Intra-cell interference is due to reception of non-orthogonal signals transmitted from the base station (e.g. the synchronisation channel in WCDMA) or due to multi-path propagation of the communication signal). One important feature of intra-cell interference is that it travels the same path as the communication signal and thus experience the same fading.

The type of interference that a communication signal is distorted with at reception by a mobile communication terminal is an important parameter for optimisation of several algorithms in the terminal and in turn for improving the quality of the wire-less communication.

There exists known methods for classifying interference by means of spectrum estimation techniques. However, these methods are very complex and involves large processing means. The different types of interference may degrade performance of a mobile communications terminal. Thus there is a need for a less complex method that can be implemented in small-sized and/or mobile communication terminals.

Therefore, the prior art involves the problem that a present type of interference affecting performance in the form of transmission capacity and/or quality of a mobile communications terminal is not determined—thereby not making it possible to take the type of interference into communications terminal.

SUMMARY

Thus an object of this invention is to provide a mobile communications terminal for use in a cellular communications system capable of determining a present type of interference.

This is achieved when the mobile communications terminal mentioned in the opening paragraph is characterized in that the electronic circuit is adapted to classify a type of interference, affecting the communications quality, by evaluating signals selected in the electronic circuit as signals having information for classifying a type of interference in one of at least two predetermined classes of interference.

A mobile communications terminal for use in a cellular communications system includes an electronic circuit for receiving a wire-less communications signal carrying signal channels having processing means for extracting the signal channels. The electronic circuit is adapted to classify a type of interference affecting communications quality by evaluating signals selected in the electronic circuit that are selected as signals having information for classifying a type of interference in one of at least two predetermined classes of interference.

A method in a mobile communications terminal adapted for use in a cellular communications system includes receiving a wire-less communications signal carrying signal channels and extracting the signal channels via an electronic circuit. The method also includes classifying a type of interference affecting the communications quality by evaluating signals selected in the electronic circuit as signals having information for classifying a type of interference in one of at least two predetermined classes of interference.

Consequently, it is possible to determine a present type of interference by evaluating internal signals that are present in a standard mobile communications terminal. Thus, it is possible to take the type of interference into account when correcting a received communications signal—thereby providing for a better performance of the mobile communications terminal. Further, only simple means for classifying the type of interference are needed since the signals having information for classifying a present type of interference are already present internally for verifying, adjusting, or demodulating the communication signals.

BRIEF DESCRIPTION OF THE DRAWINGS

The invention will be explained more fully below in connection with a preferred embodiment and with reference to the drawing, in which.

DETAILED DESCRIPTION OF EXEMPLARY EMBODIMENTS OF THE INVENTION

Figure 1:
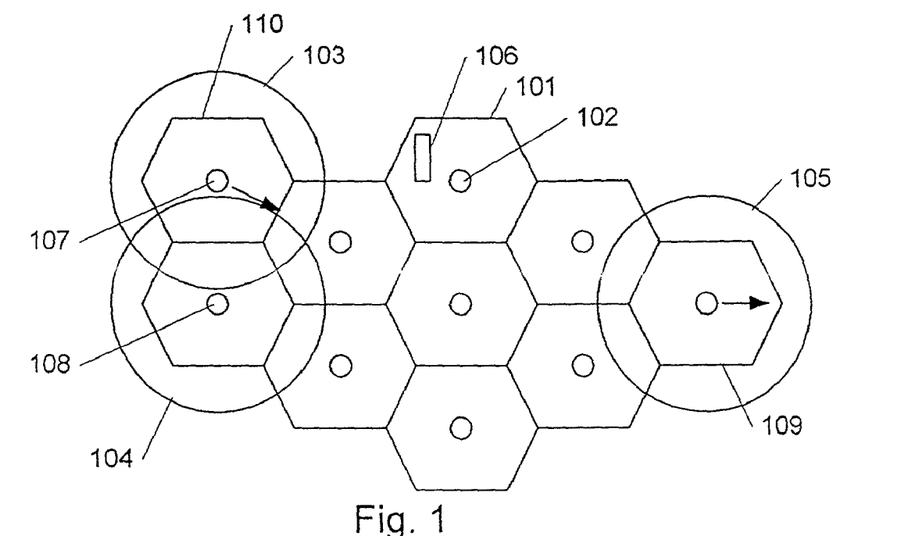
FIG. 1 shows a cell-structure in a cellular communications system.

FIG. 1 shows a cell-structure in a cellular communications system. The cell-structure comprises a number of cells 101 each of them including a base-station 102. In a mobile communications system, the base-station 102 is adapted to provide wire-less communication with one—or typically more—mobile communication terminals 106 located within the cell and to provide communication with other base-stations or switching units by means of a wired net.

The base-stations are located to provide a desired level of communication coverage for wire-less communication over a given geographical area. Wire-less communication signals emitted from a base-station with a specified power-level will be damped as a function of the distance to the transmitter. Further, since propagation of the wire-less communication signals cannot be controlled precisely due to the presence of buildings, different types of landscape features etc. it will be possible in some areas between two base-stations 107 and 108 to detect signals transmitted from both of the base-stations. Such an area is illustrated as the area covered by both of the circles 103 and 104 that indicates a radiation pattern from the base-stations 107 and 108, respectively.

In a mobile communications terminal, circuitry is adapted to select one or many out of two or more base-stations capable of providing communication with the base-stations e.g. to select the base-station providing the best communication quality. However, other base-stations still transmits communication signals that can and will interfere with communication signals from a selected base-station thus degrading the communication quality otherwise obtainable from the selected base-station. This is called inter-cell interference.

Figure 2:
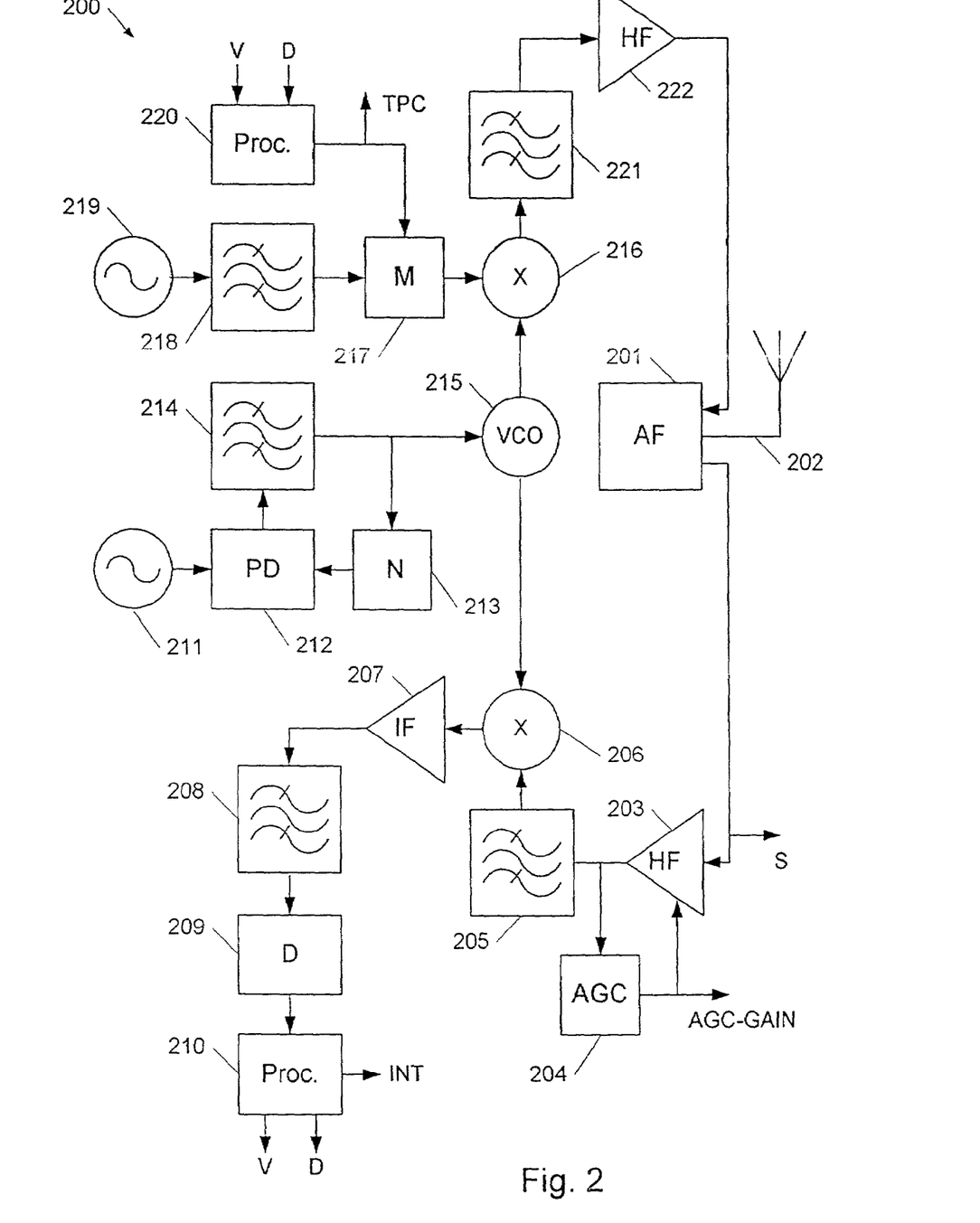
FIG. 2 shows a block-diagram of a mobile communications terminal.

FIG. 2 shows a block-diagram of a typical mobile communications terminal. It is shown how signals used for common purposes e.g. demodulation, gain control, etc. in the mobile communications terminal can be detected for the special purpose of classifying interference. A wire-less communication signal can be received by an antenna 202 connected to an antenna filter 201 for passing the communication signal and rejecting other signals. The output of the antenna filter is connected to a high frequency amplifier 203 that is controlled by an automatic gain control unit 204 to compensate for a varying signal strength of the received communication signal. The signal AGC-GAIN is a signal controlling the gain of the amplifier 203. According to the invention, such an AGC-GAIN signal can be selected as a signal having information for classifying interference.

The output of the amplifier 203 is provided as a first input signal to a mixer 206 via a band-pass filter 205 removing high-frequency noise and low-frequency components i.a. from the automatic gain control unit. A second input signal to the mixer 206 is provided by a frequency synthesis unit 211 via a phase-locked loop comprising a controlled oscillator 215, a frequency divider 213, a phase-detector 212, and a band-pass filter 214. By means of the mixer 206, the communication signal is shifted down in frequency to an intermediate frequency IF. The communication signal at the intermediate frequency is, output from the mixer 206, is fed to a demodulator 209 via an intermediate frequency amplifier 207 and a band-pass filter 208 with a pass-band around the intermediate frequency. The processor 210 is connected to the demodulator 209 to decode information e.g. voice, V, and data, D, transmitted on the communications channel.

In order to estimate the quality of the received information the processor 210 is adapted to calculate an interference power estimate. Typically, an interference estimate, INT, is calculated based on the variance of received known symbols (so-called pilots) i.e. a test sequence transmitted by the base-station. According to the invention, such an interference power estimate can be selected as a signal having information for classifying interference. Moreover, the processor 220 is adapted to calculate a signal S that represents the strength of the communication signal from the base-station the terminal is in communication with. In a so-called 3GPP the signal S can be measured as the power at the common pilot channel (CPICH). However, both in 3GPP systems and in other systems S can be measured in various ways.

The signal S representing the strength of the received communication signal can be monitored and selected as a signal having information for classifying interference.

In order to transmit information e.g. voice, V, and data, D, the information is encoded in the processor 220 to transmit this information on a communications channel. The information is modulated on a intermediate frequency IF by means of a modulator 217. The intermediate frequency IF is supplied by a frequency synthesis unit 219 via a band-pass filter 218. The modulator 217 is connected to a mixer 216 for up-shifting the signal at the intermediate frequency to a high-frequency carrier. The up-shifted signal is supplied to the antenna 202 via a band-pass filter 221, a high-frequency amplifier 222, and an antenna filter 201. According to various standards prescribing communication protocols for mobile wire-less communication there is incorporated a so-called Transmission-Power-Control, TPC, command in the communications protocols. The processor 220 is adapted to communicate such TPC commands to a base-station in response to a monitoring of a received communication signal. Thus, the mobile communications terminal can request the base-station to transmit communication signal to the terminal with more power to obtain a sufficient communication quality if the received communication signal is too weak and vice versa. According to the invention, such Transmission-Power-Control commands can be selected as a signal having information for classifying interference.

It should be noted that although a homodyne receiver has been referred to, other types of receivers e.g. homodyne receivers can include the above mentioned or other types of signals having information for classifying interference.

Figure 3:
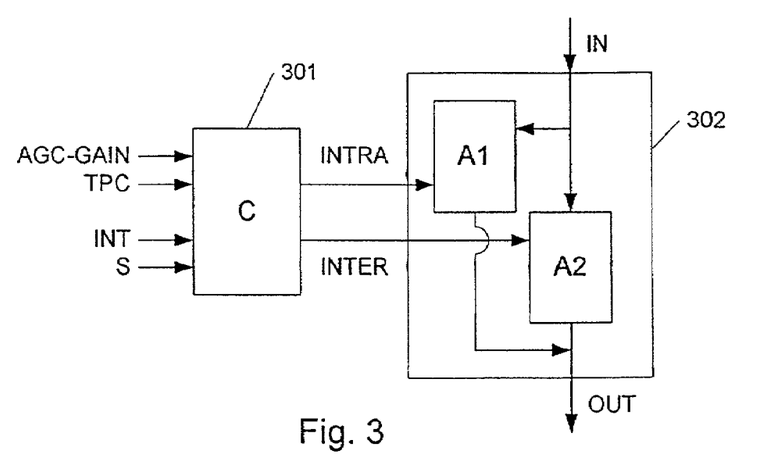
FIG. 3 shows a classifier and two algorithms.

FIG. 3 shows a classifier for determining a type of interference. The classifier 301 is connected to receive the signals AGC-GAIN, TPC, INT, and S and adapted to classify an interference affecting at least one of the signals GAIN, TPC, INT, and S as either inter-cell or intra-cell interference. The classifier 301 provides two binary signals INTRA and INTER. The binary signals can be used for selecting different algorithms depending on the type of interference determined by classifier.

A truth-table for the binary signals and an associated action is stated in table 1 below.

TABLE 1

| Action: | | INTRA | INTER |
|---|---|---|---|
| A2 enabled<br>A1 disabled | Inter-cell<br>interference | 0 | 1 |
| A1 enabled<br>A2 disabled | Intra-cell<br>interference | 1 | 0 |

When intra-cell interference is detected, the algorithm A1 is enabled and when inter-cell interference is detected, the algorithm A2 is enabled. The algorithms receives input data via the port IN and provides output data via the port OUT. Instead of enabling different algorithms in response to signals from the classifier 501 it can be expedient to load an algorithm with different sets of parameters that are selected or calculated in response to the signals from the classifier.

Inter-cell interference can be considered as stationary white noise since communication signals from base-stations in neighbour cells correlates to a small extend only with communication signals from a selected base-station. Therefore, it is convenient to reconstruct i.e. enhance the quality e.g. by enhancing the signal-to-noise ratio of the communication signal with a filter—providing some type of averaging—that has a relatively large time-constant.

Intra-cell interference, on the other hand, should not be considered as stationary white noise since a communication signal travelling along different paths creates time-shifted and amplitude varying echoes only, thus having a relatively large correlation with each other. This in turn creates an amplitude varying communication signal. Therefore, it is convenient to reconstruct the communication signal with a filter providing some type of averaging over a relatively short time interval, e.g. by means of a moving average filter.

The algorithms A1 and A2 and the classifier 301 can be embodied as program code for the processor 220—and/or be embodied directly in an application specific integrated circuit, ASIC. The algorithms A1 and A2 can implement two digital low-pass filters e.g. with a relatively high and a relatively low bandwidth.

Figure 4:
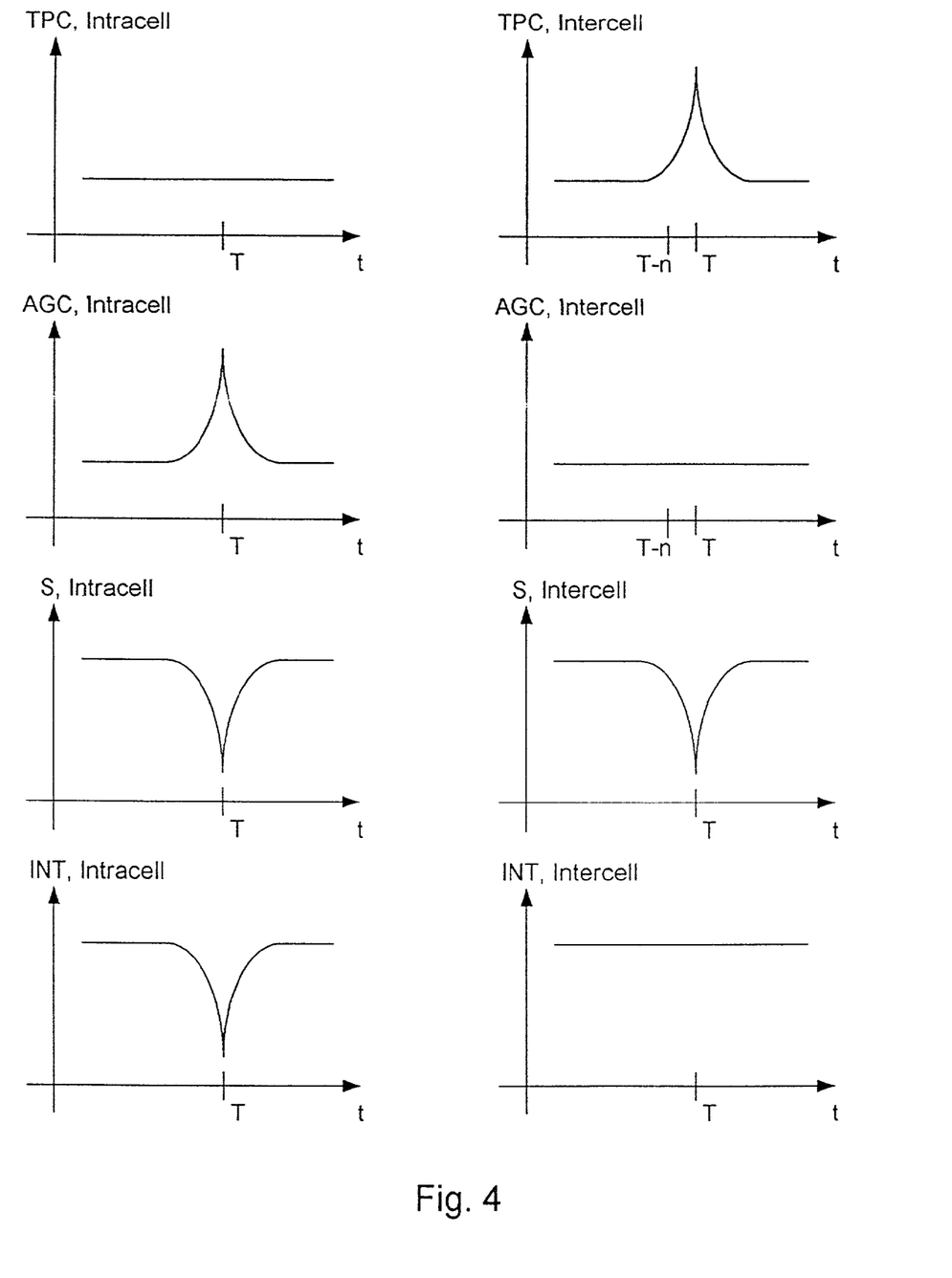
FIG. 4 shows different variables available in a mobile communications terminal as a function of time in inter-cell and intra-cell interference situations.

FIG. 4 shows different variables/signals available in a mobile communications terminal as a function of time t in inter-cell and intra-cell interference situations. These signals include information for classifying i.e. determining a type of interference and may therefore be selected for that purpose. The signals can be detected in the flow-chart shown in FIG. 5.

For all the signals shown it is assumed that maximum interference appears at time t=T. That is, the interference level has a maximum (peak) value at time t=T or—alternatively—that the interference has a minimum (a fading dip) at time t=T.

When intra-cell interference is present, the TPC signal will remain substantially constant over time, the AGC signal will peak in amplitude, and the signal strength, S, and the interference estimate will dip in amplitude.

When inter-cell interference is present, the AGC signal and the interference estimate, INT, will remain substantially constant over time, the TPC signal will peak in amplitude, and the signal strength, S, will dip in amplitude.

The signals can be continues analogue signals or discrete digital signals. The signals can be sampled over time and two or more samples at different times can be compared such that it is possible to detect the signal characteristics e.g. a peak, a dip, etc. A signal can be sampled e.g. at time t=T and at time t=T−n.

Figure 5:
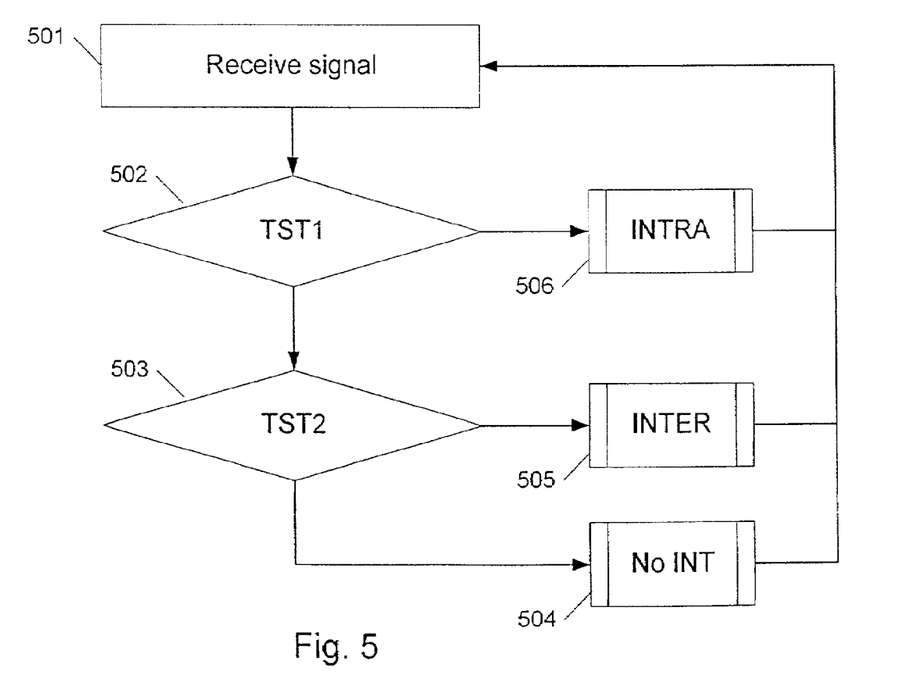
FIG. 5 shows a flow-chart for a method of classifying interference.

FIG. 5 shows a flow-chart for a method of classifying interference. The flow-chart illustrates the operation of the classifier 301 in co-operation with the mobile communications terminal in FIG. 2. In step 501 a communication signal from a base-station is received. In step 502 it is verified whether a test statement TST1 capable of detecting intra-cell interference based on selected signals is true or false. If the test statement TST1 is true it is determined that intra-cell interference is present. In step 506 the mobile communications terminal is controlled to use parameters that are optimal for receiving intra-cell distorted communication signals.

Otherwise, if the test statement TST1 is false, it is verified whether a test statement TST2 capable of detecting inter-cell interference based on selected signals is true or false. If the test statement TST2 is true it is determined that inter-cell interference is present. In step 505 the mobile communications terminal is controlled to use parameters that are optimal for receiving inter-cell distorted communication signals.

The test statement TST1 capable of detecting intra-cell interference can be stated in numerous ways, e.g. in the following ways:

TST1: a) ABS(INT(T)-INT(T−n))<e b) ABS(AGC(T)-AGC(T−n))<e

Likewise, the test statement TST2 capable of detecting inter-cell interference can be stated in numerous ways, e.g. in the following ways:

TST2: c) ABS(INT(T)-INT(T−n))>e d) ABS(TPC(T)-TPC(T−n))<e

It should be noted that other alternatives are possible for classifying interference—such alternatives can be found in the field of time series analysis, multivariate statistics, pattern recognition etc.

Figure 6:
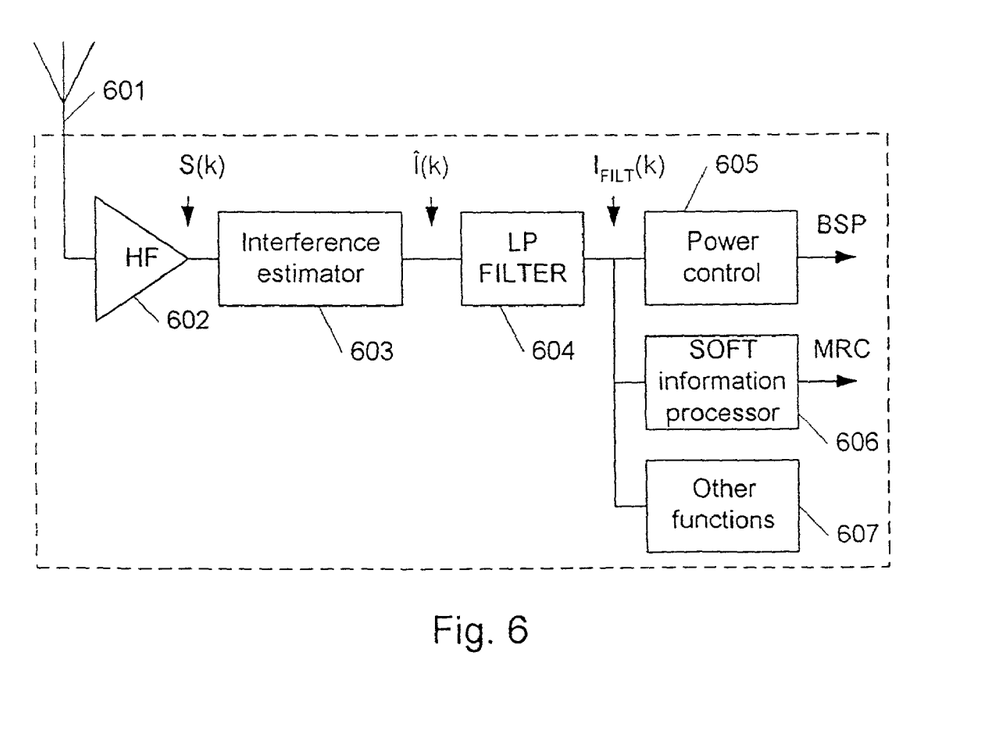
FIG. 6 shows a block-diagram of a mobile communications terminal according to the invention wherein the determined interference type is used to improve the interference power estimate.

FIG. 6 shows a block-diagram of a preferred mobile communications terminal according to the invention wherein the determined interference type is used to improve the interference power estimate. The terminal comprises an antenna 601 for receiving a wire-less communication signal that is amplified and converted to a digital signal S(k) in high-frequency amplifier 602. S(k) is a sequence of digital samples where k denotes a sample in the sequence. The digital signal S(k) is provided to an interference estimator 603 that provides an interference estimate in the form of a sequence of digital samples Î(k). This interference estimate is supplied to a digital low-pass filter 604. The time-domain transfer function for the digital filter can be written as:

$$I_{FILT}(k) = \alpha I_{FILT}(k-1) + (1-\alpha)\hat{I}(k)$$

where Î(k) is input to the filter, $I_{FILT}(k)$ is output from the filter and α is a filter constant. The number of samples the filter is calculating an average over can be approximated as $1/(1-\alpha)$.

In the case that the dominating interference is classified as inter-cell interference, the interference power estimate is calculated by employing much filtering in the estimation of the interference power estimate. This can be carried out by averaging over a relatively large number of samples, e.g. with α≈0,99; thereby the filter has a relatively low band-width. Consequently, the variance of the interference power estimate is reduced. This will improve the interference power estimate since in this situation the interference may appear as almost stationary in time (the signals causing the interference are almost uncorrelated with the communication signal).

In the case that present interference is classified as intra-cell interference only limited filtering is applied in the estimation of the interference power estimate. This can be carried out by averaging over a relatively small number of samples, e.g. with α≈0,80; thereby the filter has a relatively high band-width. In this situation the signals causing the interference is highly correlated with the communication signal (they will appear as echoes with almost the same amplitude as the first arriving signal that is interpreted as the communication signal) and thus will exhibit heavy fluctuations over time.

The output signal from the digital filter 604 is supplied to a power control component 605. This power control component is arranged to communicate with the base station to control the power level of communication signals transmitted to the mobile terminal.

The output signal from the digital filter 604 is also supplied to a soft information processor 606 that provides so-called side information in the form of a Maximum Ratio Combining (MRC) signal. Side information provides a quality measure of the received wireless signal and can in turn be used as reliability information in a process of decoding symbols in the received signal.

The soft information processor 606 receives the filtered symbols and split them into a number of branches; in each branch random values are added to the filtered symbols $I_{FILT}(k)$. In each branch a filter is applied. The bandwidth of these filters are adjusted according to the type of interference. The filters may be low-pass filters where a relatively low cut-off frequency is selected when intra cell interference is present, and where a relatively high cut-off frequency is selected when inter cell interference is present. Signals provided by each of the branches are added with a weight value that equals the signal-to-noise ratio for each branch and subsequently supplied as the Maximum Ratio Combining signal.

Although inter-cell and intra cell-inter interference has been described as two major groups of interference a more precise classification of interference can be used.

The invention can find application in all fields of mobile wire-less communications systems—e.g. in systems allowing for direct terminal-to-terminal communication without involving a base-station.

We claim:

1. An apparatus for classifying interference in a mobile communications terminal comprising:
   an electronic circuit configured to receive a wireless communications signal carrying signal channels with transmitted information, the electronic circuit comprising signal processing units adapted to provide at least one of: a signal representing gain from an automatic gain control (AGC signal), a transmission power control command signal (TPC command signal), and a signal representing strength of the wireless communications signal; and
   an interference classifier adapted to classify a type of interference affecting communications quality by evaluating time-domain behavior of at least one of the AGC signal, the TPC command signal, and the signal representing the strength of the wireless communications signal; and wherein the type of interference is classified in one of at least two predetermined classes of interference, wherein a first class of interference includes inter-cell interference, and a second class of interference includes intra-cell interference, and the interference classifier is adapted to identify and discriminate between inter-cell interference and intra-cell interference.

2. The apparatus of claim 1, further comprising filter means for processing the wireless communication signal via a set of filter coefficients selected dependent upon of a classified type of interference.

3. The apparatus of claim 2, wherein:
   the filter means comprises a low-pass filter; and
   the low-pass filter has a relatively wide band-width when interference is classified to be intra-cell interference and a relatively narrow band-width when interference is classified to be inter-cell interference.

4. The apparatus of claim 1, further comprising the interference classifier coupled to the electronic circuit wherein the interference classifier is adapted to output pre-determined binary signals corresponding to INTRA and INTER, the state of the pre-determined binary signals operable to select a different interference reduction algorithm depending on the type of interference.

5. The method of claim 4, wherein a first pre-determined binary signal corresponds to INTER in the event of inter-cell interference and a second pre-determined binary signal corresponds to INTRA in the event of intra-cell interference.

6. The apparatus of claim 4, further comprising a filter means for processing the wireless communication signal via a set of filter coefficients selected dependent upon the predetermined binary signal outputted.

7. The apparatus of claim 6, wherein:
   the filter means comprises a low-pass filter having a relatively wide band-width when the predetermined binary signal corresponds to INTRA and a relatively narrow band-width when the predetermined binary signal corresponds to INTER.

8. In a mobile communications terminal adapted for use in a cellular communications system, a method of classifying interference, comprising the steps of:
   receiving a wireless communications signal carrying signal channels;
   extracting the signal channels;
   providing at least one of:
      a signal representing gain from an automatic gain control (AGC signal);
      a transmission-power-control command signal (TPC command signal); and
      a signal representing a strength of the wireless communications signal;
   classifying a type of interference affecting communications quality by evaluating a time-domain behavior of at least one of the AGC signal, the TPC command signal, the signal representing the strength of the wireless communications signal; and
   wherein the type of interference is classified in one of at least two predetermined classes of interference, wherein a first class of interference includes inter-cell interference, and a second class of interference includes intra-cell interference, and the interference classifier adapted to identify and discriminate between inter-cell interference and intra-cell interference.

9. The method of claim 8, further comprising:
filtering the wireless communications signal with a low-pass filter; and
wherein the filter has a relatively high band-width when interference is classified to be intra-cell interference and has a relatively low band-width when interference is classified inter-cell interference.

10. An apparatus for classifying interference in a mobile communications terminal comprising:
an electronic circuit configured to receive a wireless communications signal carrying signal channels with transmitted information, the electronic circuit comprising signal processing units adapted to provide at least one signal for at least one of adjusting, verifying, and demodulating the wireless communication signal;
an interference classifier adapted to receive the at least one signal and to classify a type of interference affecting communications quality by evaluating the time-domain behavior of the at least one signal, wherein the at least one signal is selected from the group consisting of: a signal representing gain from an automatic gain control (AGC signal), a transmission power control command signal (TPC command signal), and a signal representing strength of the wireless communications signal wherein the type of interference is classified in one of at least two predetermined classes of interference, and the interference classifier is adapted to identify and discriminate between intra-cell interference and inter-cell interference.

11. In an apparatus to classify interference in a mobile communications terminal adapted for use in a cellular communications system, a method comprising the steps of:
receiving a wireless communications signal carrying signal channels;
extracting the signal channels;
providing at least one signal for at least one of adjusting, verifying, and demodulating the wireless communication signal, wherein the at least one signal comprises one selected from the group consisting of a signal representing gain from an automatic gain control (AGC signal), a transmission-power-control command signal (TPC command signal), and a signal representing a strength of the wireless communications signal;
classifying a type of interference affecting communications quality by evaluating a time-domain behavior of the at least one signal wherein the type of interference is classified in one of at least two predetermined classes of interference; and
identifying and discriminating between intra-cell interference and inter-cell interference.

12. An apparatus to classify interference in a mobile communications terminal comprising:
an electronic circuit configured to receive a wireless communications signal carrying signal channels with transmitted information, the electronic circuit further comprising signal processing units adapted to provide a signal representing gain from an automatic gain control (AGC signal); and
an interference classifier coupled to the electronic circuit adapted to classify a type of interference affecting communications quality, wherein the type of interference is classified in one of at least two predetermined classes of interference by evaluating the time-domain behavior of the AGC signal, the interference classifier adapted to identify and discriminate between intra-cell interference and inter-cell interference.

13. An apparatus to classify interference in a mobile communications terminal comprising:
an electronic circuit configured to receive a wireless communications signal carrying signal channels with transmitted information, the electronic circuit further comprising signal processing units adapted to provide a signal representing gain from a transmission power control command signal (TPC command signal); and
an interference classifier coupled to the electronic circuit adapted to classify a type of interference affecting communications quality, wherein the type of interference is classified in one of at least two predetermined classes of interference by evaluating the time-domain behavior of the TPC command signal, the interference classifier adapted to identify and discriminate between intra-cell interference and inter-cell interference.

14. An apparatus to classify interference in a mobile communications terminal comprising:
an electronic circuit configured to receive a wireless communications signal carrying signal channels with transmitted information, the electronic circuit comprising signal processing units adapted to provide a signal representing a signal representing strength of the wireless communications signal;
an interference classifier coupled to the electronic circuit adapted to classify a type of interference affecting communications quality
wherein the type of interference is classified in one of at least two predetermined classes of interference, and the interference classifier adapted to classify a type of interference affecting communications quality by evaluating the time-domain behavior of the signal representing strength of the wireless communications signal, the interference classifier adapted to identify and discriminate between intra-cell interference and inter-cell interference.

15. An apparatus to classify interference in a mobile communications terminal comprising:
an electronic circuit configured to receive a wireless communications signal carrying signal channels with transmitted information;
an interference classifier coupled to the electronic circuit adapted to classify a type of interference affecting communications quality wherein the type of interference is classified in one of at least two predetermined classes of interference, wherein a first class of interference includes inter-cell interference; and a second class of interference includes intra-cell interference, the interference classifier adapted to identify and discriminate between intra-cell interference and inter-cell interference.

16. An apparatus to classify interference in a mobile communications terminal comprising:
an electronic circuit configured to receive a wireless communications signal carrying signal channels with transmitted information;
an interference classifier coupled to the electronic circuit adapted to classify a type of interference affecting communications quality, wherein the type of interference is classified in one of at least two predetermined classes of interference, the interference classifier adapted to identify and discriminate between intra-cell interference and inter-cell interference; and means for processing the communication signal in a first of at least two ways, wherein the first way is selected dependent upon a classified type interference.

17. An apparatus to classify interference in a mobile communications terminal comprising:
an electronic circuit configured to receive a wireless communications signal carrying signal channels with transmitted information;
an interference classifier coupled to the electronic circuit adapted to classify a type of interference affecting communications quality, wherein the type of interference is classified in one of at least two predetermined classes of interference, the interference classifier adapted to identify and discriminate between intra-cell interference and inter-cell interference; and
a filter means for processing the wireless communication signal via a set of filter coefficients selected dependent upon of a classified type of interference.

18. The apparatus of claim 17, wherein:
the filter means comprises a low-pass filter; and
the low-pass filter has a relatively wide band-width when interference is classified to be intra-cell interference and a relatively narrow band-width when interference is classified to be inter-cell interference.

* * * * *

UNITED STATES PATENT AND TRADEMARK OFFICE
CERTIFICATE OF CORRECTION

PATENT NO. : 7,379,724 B2  Page 1 of 1
APPLICATION NO. : 10/025526
DATED : May 27, 2008
INVENTOR(S) : Nilsson et al.

It is certified that error appears in the above-identified patent and that said Letters Patent is hereby corrected as shown below:

On the Title Page, Item (75), under "Inventors", in Column 1, Line 3, delete "Lund" and insert -- Tyreso --, therefor.

On the Title Page, Item (73), under "Assignee", in Column 1, Line 1, delete "Telefonkatiebolaget" and insert -- Telefonaktiebolaget --, therefor.

In Column 2, Line 23, after "into" insert -- account when communicating by means of the mobile --.

In Column 10, Line 26, in Claim 14, delete "a signal representing" before "Strength".

Signed and Sealed this

Twenty-eighth Day of October, 2008

JON W. DUDAS
*Director of the United States Patent and Trademark Office*